United States Patent
Yoshino et al.

(10) Patent No.: US 7,786,997 B2
(45) Date of Patent: Aug. 31, 2010

(54) PORTABLE GAME MACHINE AND COMPUTER-READABLE RECORDING MEDIUM

(75) Inventors: Hiroshi Yoshino, Kyoto (JP); Keizo Ohta, Kyoto (JP); Yoshitaka Yasumoto, Kyoto (JP); Kenji Nishida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 983 days.

(21) Appl. No.: 10/921,957

(22) Filed: Aug. 20, 2004

(65) Prior Publication Data

US 2005/0227761 A1 Oct. 13, 2005

(30) Foreign Application Priority Data

Mar. 31, 2004 (JP) ............................. 2004-106874

(51) Int. Cl.
*G09G 5/39* (2006.01)
(52) U.S. Cl. ..................... 345/531; 345/1.1; 345/419; 345/537; 345/541; 463/30; 463/31; 463/32; 463/33
(58) Field of Classification Search ................. 463/32, 463/31; 345/3.1
See application file for complete search history.

(56) References Cited

U.S. PATENT DOCUMENTS

| | | | | |
|---|---|---|---|---|
| 4,542,903 | A * | 9/1985 | Yokoi et al. | 463/31 |
| 5,762,553 | A * | 6/1998 | Takasugi et al. | 463/34 |
| 6,215,459 | B1 * | 4/2001 | Reddy et al. | 345/3.1 |
| 6,522,309 | B1 * | 2/2003 | Weber | 345/1.1 |
| 6,716,103 | B1 | 4/2004 | Eck et al. | |
| 6,743,104 | B1 | 6/2004 | Ota et al. | |
| 6,821,204 | B2 * | 11/2004 | Aonuma et al. | 463/32 |
| 2002/0151360 | A1 | 10/2002 | Durham et al. | |
| 2004/0219980 | A1 * | 11/2004 | Bassett et al. | 463/33 |
| 2004/0224760 | A1 * | 11/2004 | Miyamoto et al. | 463/32 |
| 2004/0229687 | A1 * | 11/2004 | Miyamoto et al. | 463/30 |
| 2005/0075167 | A1 * | 4/2005 | Beaulieu et al. | 463/32 |
| 2005/0096134 | A1 * | 5/2005 | Lippincott | 463/40 |

FOREIGN PATENT DOCUMENTS

JP 2001-067054 3/2001
WO WO 00/79372 12/2000

* cited by examiner

*Primary Examiner*—Xiao M Wu
*Assistant Examiner*—Phi Hoang

(57) ABSTRACT

In each odd-numbered frame, a game image generated by a three-dimensional image processing unit 31 is supplied to a first LCD 11, and then a game image identical to the generated game image is stored in a first VRAM 21a. Also, a two-dimensional image processing unit 37 supplies the game image stored in the immediately-preceding even-numbered frame in a second VRAM 21b to a second LCD 12. On the other hand, in each even-numbered frame, a game image generated by the three-dimensional image processing unit 31 is supplied to the first LCD 12, and then a game image identical to the generated game image is stored in the second VRAM 21b. Also, the two-dimensional image processing unit 37 supplies the game image stored in the immediately-preceding odd-numbered frame in the first VRAM 21a to the first LCD 11. With this, in a portable game machine including two display units, different three-dimensional game images can be simultaneously displayed by a single three-dimensional image processing unit on the two display units without flicker on the display screens.

13 Claims, 12 Drawing Sheets

PORTABLE GAME MACHINE AND COMPUTER-READABLE RECORDING MEDIUM

BACKGROUND AND SUMMARY

1. Field of the Technology

The illustrative embodiments relate to portable game machines and, more specifically, to a portable game machine including two or more display units, on each of which a three-dimensional game image, generated by a three-dimensional image processing unit, is displayed.

2. Description of the Background Art

Conventionally, in order to enhance a display screen area by using a plurality of display units, a computer system as disclosed in Japanese Patent Laid-Open Publication No. 2001-67054 (hereinafter referred to as a patent document) has been suggested. Specifically, as shown in FIGS. 6 and 7 in the patent document, this computer system includes two graphic engines in order to display images on two display units. Furthermore, each graphic engine includes a 2D engine for generating a two-dimensional image and a 3D engine for generating a three-dimensional image. This makes it possible to simultaneously display a three-dimensional or two-dimensional image on each of the two display units.

Also, it is known that a dual monitor system can be achieved by inserting two graphic cards or a single graphic card, having incorporated therein two graphic engines, in personal computers or the like, thereby simultaneously displaying three-dimensional or two-dimensional images on two display units.

In the above-described conventional technology, in order to display different three-dimensional or two-dimensional images on two display units, a graphic engine including a 2D engine for generating a two-dimensional image and a 3D engine for generating a three-dimensional image has to be provided for each display unit.

Here, portable game machines including two display units have also been suggested in order to enhance a display area. In such portable game machines, it is desired that a three-dimensional image is displayed on each display unit. However, portable game machines are required to be power-thrifty, small in size, and inexpensive. Therefore, it is not preferable to directly apply the above-described conventional technology to portable game machines. Reasons for this are specifically described below.

The 3D engine is required to perform complex coordinate calculations, and therefore is significantly larger in circuit size than the 2D engine. Therefore, providing two 3D engines corresponding to two display units invites an increase in power consumption, an increase in heating, an increase in the area of a semiconductor chip on which the 3D engine circuit is mounted, and an increase in cost. The increase in power consumption hastens exhaustion of a battery, thereby requiring frequent battery replacement by a player. The increase in heating requires a large housing for heat dissipation, thereby making it more difficult to easily carry the portable game machine. For these reasons, providing a plurality of 3D engines to the portable game machine may be ideal, but is not realistic.

Moreover, the computer system is provided with a selector for switching between the two graphic engines. Here, consideration is given below to whether three-dimensional images can be simultaneously displayed on two display units by using either one of the graphic engines to generate a three-dimensional image and then using the selector to select a destination to which the generated three-dimensional image is to be output. In this case, while an output from a single graphic engine is being supplied to one of the display units, no outputs from that graphic engine are supplied to the other display unit. In general, display units typified by LCDs and CRTs are configured to update a display screen at intervals of 1/60 seconds, and their graphic engine generates three-dimensional images of 60 frames per second for output. Therefore, If the three-dimensional images generated by the graphic engine are output alternately to two display units, each display unit is temporarily in a blank state for each frame, causing noticeable flicker on the display screen to the user.

Therefore, an feature of an illustrative embodiment is to provide a portable game machine capable of simultaneously displaying different three-dimensional images on two display units by using a single three-dimensional image processing unit without causing flicker on display screens.

Also, another feature of an illustrative embodiment is to make it possible for a portable game machine to include two display units, at least one two-dimensional image processing unit, and a single three-dimensional image processing unit, wherein a game image generated by the two-dimensional image processing unit is displayed on one of the display units and a game image generated by the three-dimensional image processing unit is displayed on the other display unit, and to simultaneously display different three-dimensional game images on the two display units without adding another three-dimensional image processing unit or substantially changing the configuration of the portable game machine.

An illustrative embodiment adopts the following structure to achieve the object mentioned above. Note that reference characters and numerals in parentheses below merely show examples of correspondence with the embodiment described further below for the sake of better understanding of the exemplary embodiment presented herein, and do not restrict the scope.

A first aspect of an illustrative embodiment is directed to a portable game machine including: a first display unit (11); a second display unit (12); a three-dimensional image processing unit (31); a capture circuit (33); a storage unit (21); a two-dimensional image processing unit (37); and an output destination setting circuit (35).

The three-dimensional image processing unit generates a first game image based on three-dimensional model data for each frame. The capture circuit captures the first game image generated by the three-dimensional image processing unit as two-dimensional image data. The storage unit stores the two-dimensional image data captured by the capture circuit. The two-dimensional image processing unit generates a second game image based on two-dimensional image data in a previous frame already stored in the storage unit. The output destination setting circuit (35) sets one of the first display unit and the second display unit as an output destination of the first game image and another one of the first display unit and the second display unit as an output destination of the second game image.

According to a second aspect of an illustrative embodiment based on the first aspect, in an n-th frame, the first game image generated by the three-dimensional image processing unit is output to the first display unit and is simultaneously captured, and the second game image captured in an (n−1)-th frame and based on the two-dimensional image data is output to the second display unit. In an (n+1)-th frame, the first game image generated by the three-dimensional image processing unit is output to the second display unit and is simultaneously captured, and the second game image based on the two-dimensional image data and captured in the n-th frame is output to the first display unit.

According to a third aspect of an illustrative embodiment based on the first aspect, the portable game machine further includes a first line buffer (32) for temporarily storing data for one line of the first game image generated by the three-dimensional image processing unit. The data for one line stored in the first line buffer is sequentially output to one of the first display unit and the second display unit, thereby eventually outputting an entirety of the first game image to the one of the first display unit and the second display unit. The capture circuit sequentially captures the data for one line stored in the first line buffer, thereby eventually storing the entirety of the first game image in the storage unit.

According to a fourth aspect of an illustrative embodiment based on the third aspect, the storage unit includes a first storage area (21a) and a second storage area (21b). Also, the portable game machine further includes: a second line buffer (38); a first selector (34); a second selector (36); a third selector (35); and a control unit (23). The second line buffer temporarily stores data for one line of the second game image generated by the two-dimensional image processing unit. The first selector switches an output destination of the capture circuit between the first storage area and the second storage area. The second selector switches an output destination of the two-dimensional image processing unit between the first storage area and the second storage area. The third selector switches an output destination of the first line buffer and an output destination of the second line buffer between the first display unit and the second display unit. The control unit controls a time of switching of each of the first selector, the second selector, and the third selector.

According to a fifth aspect of an illustrative embodiment based on the first aspect, the storage unit is provided with storage areas that correspond to at least two virtual screens (21c, 21d) to be used when the two-dimensional image processing unit generates the second game image. The capture circuit outputs the captured game image alternately to the storage areas in the storage unit that correspond to the two virtual screens. The two-dimensional image processing unit outputs one (21c) of the two virtual screens to the first display unit and another one (21d) of the two virtual screen to the second display unit.

According to a sixth aspect of an illustrative embodiment based on the first aspect, the three-dimensional image processing unit alternately generates and outputs, for each frame, game images representing two different states of a different virtual three-dimensional game space.

According to a seventh aspect of an illustrative embodiment based on the first aspect, the three-dimensional image processing unit alternately generates and outputs two different game images representing a state of a single virtual three-dimensional game space captured by a virtual camera with two different settings (FIG. 6).

An eighth aspect of an illustrative embodiment is directed to a computer-readable storage medium having stored therein a program causing a computer connected to a display unit to function as: display means, three-dimensional image processing means, capture means, storage means, two-dimensional image processing means, and output destination setting means.

The display means causes the display unit to display a first screen and a second screen. The three-dimensional image processing means generates a first game image for each frame based on three-dimensional model data. The capture means captures the first game image generated by the three-dimensional image processing means as two-dimensional image data. The storage means stores the two-dimensional image data captured by the capture means. The two-dimensional image processing means generates a second game image based on two-dimensional image data in a previous frame already stored in the storage means. The output destination setting means sets one of the first display unit and the second display unit as an output destination of the first game image and another one of the first display unit and the second display unit as an output destination of the second game image.

A ninth aspect of an illustrative embodiment is directed to a computer-readable storage medium having stored therein a program to be executed in a portable game machine including: a first display unit (11); a second display unit (12); a three-dimensional image processing unit (31); a capture circuit (33); a storage unit (21); a two-dimensional image processing unit (37); and an output destination setting circuit (35).

This program causes a computer (23) of the portable game machine to perform steps including: in an n-th frame, a step (S31, S32) of causing the three-dimensional image processing unit to generate the first display image; a step (S36) of causing the capture circuit to capture the first display image; a step (S39) of causing the two-dimensional image processing unit to generate the second game image based on two-dimensional image data captured in the n-th frame; and a step (S15) of causing the output destination setting circuit to set the first display unit as the output destination of the first game image and the second display unit as the output destination of the second game image.

Also, this program causes the computer of the portable game machine to perform steps further including: in an (n+1)-th frame, a step (S51, S52) of causing the three-dimensional image processing unit to generate the first display image; a step (S56) of causing the capture circuit to capture the first display image; a step (S59) of causing the two-dimensional image processing unit to generate the second game image based on two-dimensional image data captured in the n-th frame; and a step (S19) of causing the output destination setting circuit to set the second display unit as the output destination of the first game image and the first display unit as the output destination of the second game image.

According to a tenth aspect of an illustrative embodiment based on the ninth aspect, the three-dimensional image processing unit generates game images representing a virtual three-dimensional game space viewed from a first view point and a second view point that are different from each other. Also, the program causes the computer to performs the further steps of: causing the three-dimensional image processing unit to generate, in the n-th frame, a first game image based on the first view point; and causing the three-dimensional image processing unit to generate, in an (n+1)-th frame, a first game image based on the second view point (FIG. 6).

According to the first aspect, when the first game image generated by the three-dimensional image processing unit is output to the first display unit (or the second display unit), the image of the previous frame captured by the capture circuit is output to the second display unit (or the first display unit). With this, by using a single three-dimensional image processing unit, a three-dimensional game image can be displayed on two display units.

According to the second aspect, the first game image generated by the three-dimensional image processing unit is output alternately to the first display unit and the second display unit. With this, by using a single three-dimensional image processing unit, a three-dimensional game image can be displayed on two display units. Also, a display unit that is not supplied with the first game image is supplied, via the second-image processing unit, with the first game image captured in the immediately-preceding frame by the capture circuit for display. Therefore, no flicker occurs on the display screen. Also, the image on each display unit is updated once in a two-frame period. Therefore, a moving game image can be smoothly displayed.

According to the third aspect, the first game image generated by the three-dimensional game processing unit is output via a line buffer to a display unit. Therefore, compared with the case where a frame buffer is provided between the three-dimensional image processing unit and the display unit, the size and cost of the portable game machine can be reduced.

According to the fourth aspect, the first selector, the second selector, and the third selector control the control unit as appropriate, thereby causing the portable game machine to easily performing the operation according to the first aspect.

According to the fifth aspect, the first game image captured by the capture circuit is stored in the storage unit as two-dimensional image data for two virtual screens to be originally used when the two-dimensional image processing unit generates a second game image. Therefore, a storage area for temporarily storing the captured first game image is not additionally required, thereby reducing the cost of the portable game machine. Also, a function of outputting the image corresponding to one of the virtual screens is a function originally provided to the two-dimensional image processing unit. Therefore, no special function is additionally required in the two-dimensional image processing unit. A function of switching among a plurality of virtual screens for display is a function originally provided to the two-dimensional image processing unit.

According to the sixth aspect, by using a single three-dimensional image processing unit, different states of the virtual three-dimensional game space can be displayed on two display units.

According to the seventh aspect, by using a single three-dimensional image processing unit, states of the virtual three-dimensional game space captured by the virtual camera with different settings can be displayed on two display units.

These and other features, aspects and advantages of the present invention will become more apparent from the following detailed description of the present invention when taken in conjunction with the accompanying drawings.

BRIEF DESCRIPTION OF THE DRAWINGS

FIG. 7 is an illustration showing one example of a game screen displayed on a first display screen 11a and a second display screen 12a;

DETAILED DESCRIPTION OF THE DRAWINGS

Hereinafter, a portable game machine 1 according to an embodiment is described. As the game machine according to the exemplary embodiment, a game machine physically including two display screens with one of the display screens being covered with a touch panel is exemplarily described. In the present embodiment, a game image is displayed on at least the display screen covered with the touch panel. Also, a non-portable video game machine, an arcade game machine, a portable terminal, a cellular phone, or a personal computer may be used as the game machine.

Figure 1:
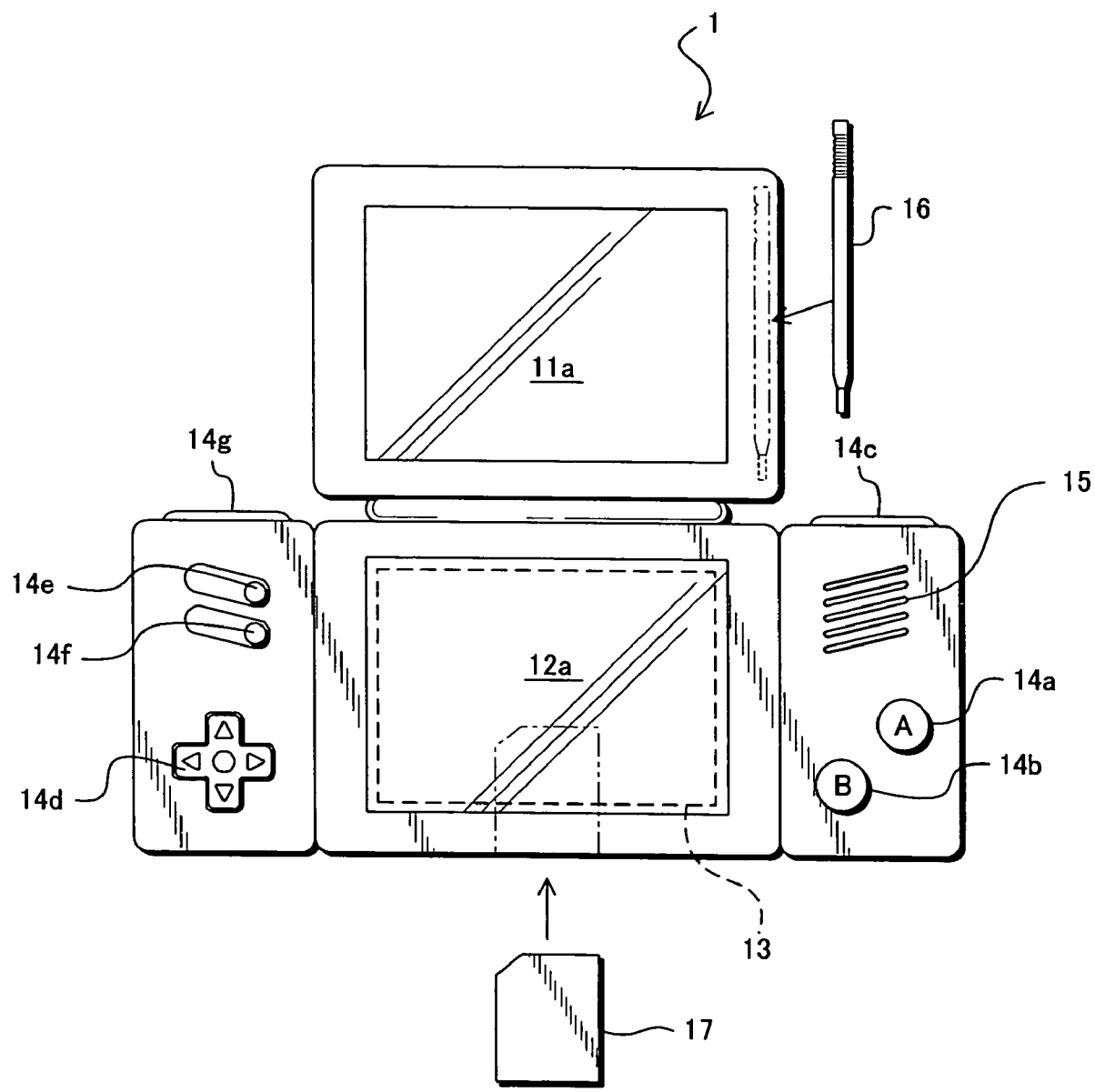
FIG. 1 is an external view of a portable game machine 1 according to one embodiment.

FIG. 1 is an external view of the portable game machine 1. As shown in FIG. 1, the portable game machine 1 includes two display screens, that is, a first display screen 11a and a second display screen 12a. The surface of the second display screen 12a is covered with a touch panel 13. Also, to the right of the second display screen 12a, the game machine includes an A button 14a, a B button 14b, and an R switch 14c, which are operable by the right hand of the player, and a loudspeaker 15 for producing game music. To the left of the second display screen 12a, the game machine includes a cross key 14d, a start button 14e, a select button 14f, and an L switch 14g, which are operable by the left hand of the player. Also, the portable game machine 1 includes a removable stylus 16 for input to the touch panel 13. Furthermore, the portable game machine 1 has, removably inserted therein, a cartridge 17, which is a storage medium having stored therein a game program of the illustrative embodiments. Note that, in the present embodiment, the touch panel 13 is exemplarily provided as an input unit, but this does not restrict the present invention.

Figure 2:
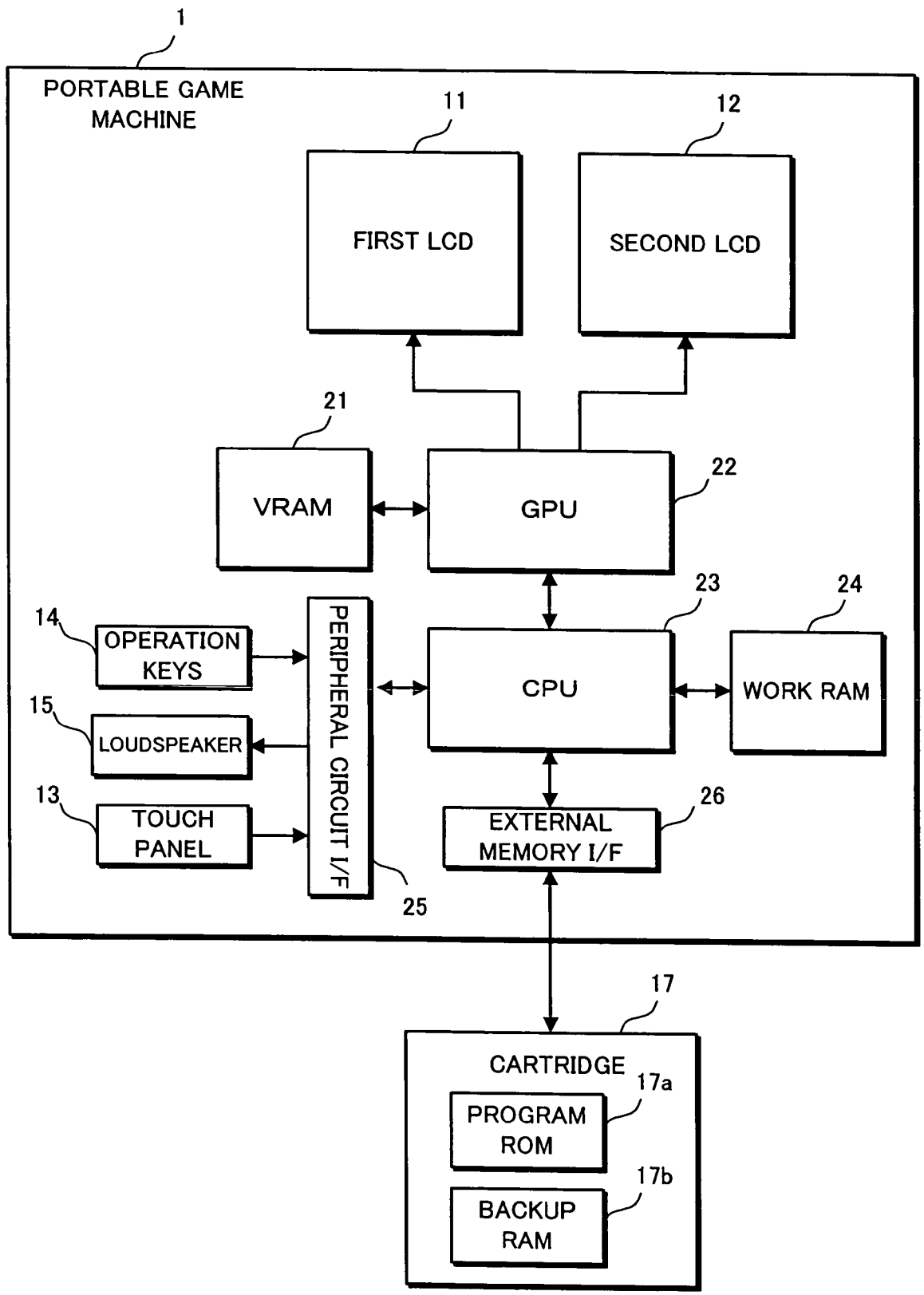
FIG. 2 is an illustration showing an internal configuration of a portable game machine 1.

FIG. 2 is a block diagram showing the portable game machine 1. As shown in FIG. 2, the portable game machine 1 includes a CPU (central processing unit) 23, which is an example of a computer for executing the game program, and other components. The CPU 23 includes a work RAM (working storage unit) 24, a GPU (graphic processing unit) 22, and a peripheral circuit I/F (interface) 25 that are electrically connected to one another. The work RAM 24 is a memory for temporarily storing, for example, the game program to be executed by the CPU 23 and calculation results of the CPU 23. The GPU 22 uses, in response to an instruction from the CPU 23, a VRAM 21 to generate a game image for display output to a first LCD (liquid crystal display unit) 11 and a second LCD 12, and causes the generated game image to be displayed on the first display screen 11a of the first LCD 11 and the second display screen 12a of the second LCD 12. The peripheral circuit I/F 25 is a circuit for transmitting and receiving data between external input/output units, such as the touch panel 13, the operation keys 14, and the loudspeaker 15, and the CPU 23. The touch panel 13 (including a device driver for the touch panel) outputs coordinate data corresponding to a position input (specified) with the stylus 16.

Furthermore, the CPU 23 is electrically connected to the external memory I/F 26, in which the cartridge 17 is inserted. The cartridge 17 is a storage medium for storing the game program and, specifically, includes a program ROM 17a for storing the game program and a backup RAM 17b for rewritably storing backup data. The game program stored in the program ROM 17a of the cartridge 17 is loaded to the work RAM 24 and is then executed by the CPU 23. In the present embodiment, an exemplary case is described in which the game program is supplied from an external storage medium to the portable game machine 1. However, the game program may be stored in a non-volatile memory incorporated in advance in the portable game machine 1, or may be supplied to the portable game machine 1 via a wired or wireless communication circuit.

Figure 3:
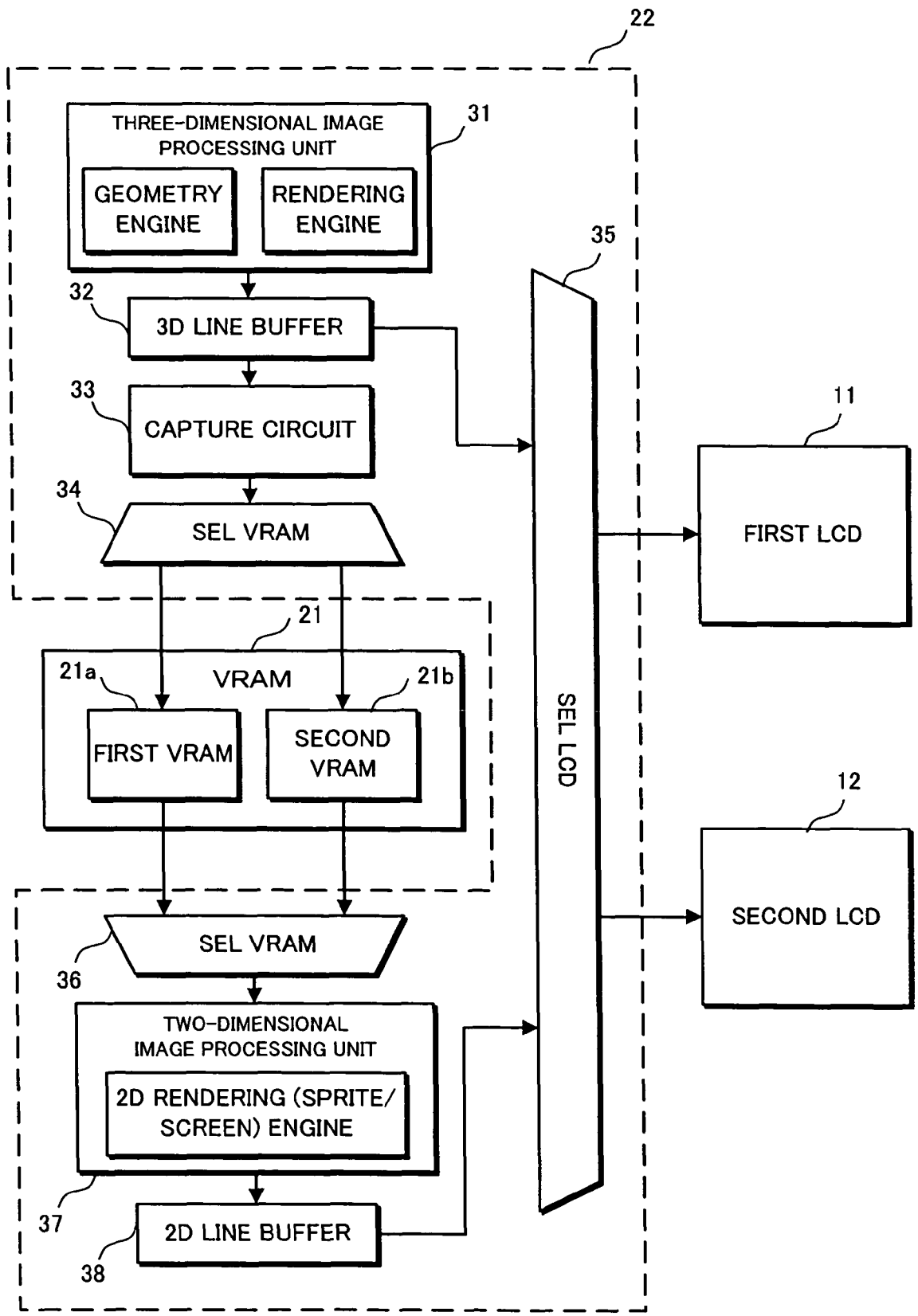
FIG. 3 is an illustration showing an internal configuration of a GPU 22.

FIG. 3 is a block diagram of the GPU 22. The GPU 22 includes two image processing units, that is, a three-dimensional image processing unit 31 and a two-dimensional image processing unit 37. The three-dimensional image processing unit 31 includes a geometry engine for calculating each vertex of a three-dimensional model based on three-dimensional model data and a rendering engine for generating a game image from the three-dimensional model disposed on a virtual three-dimensional game space. The two-dimensional image processing unit 37 includes a 2D rendering engine for generating a game image based on two-dimensional image data representing characters and two-dimensional image data representing backgrounds. More specifically, the two-dimensional image processing unit 37 disposes a two-dimensional image representing a character on a virtual screen called a "sprite" and a two-dimensional image representing a background on a virtual screen called a "screen" and then synthesizes these virtual screens to generate a game image to be eventually displayed.

The three-dimensional image processing unit 31 is connected to the 3D line buffer 32. The 3D line buffer 32 is a buffer memory for temporarily retaining image data for one scanning line of the first LCD 11 (or the second LCD 12). The image data generated by the three-dimensional image processing unit 31 is stored in this 3D line buffer 32 sequentially by one line.

The 3D line buffer 32 is connected to a capture circuit 33 and an LCD selector (SEL LCD) 35. The capture circuit 33 sequentially reads image data for one line stored in the 3D line buffer 32 and then sequentially stores the read image data in the VRAM 21, which will be described further below, thereby capturing the game image generated by the three-dimensional image processing unit 31.

The capture circuit 33 is connected to a VRAM selector (SEL VRAM) 34. The VRAM 21 is provided with two VRAMs, that is, a first VRAM 21a and a second VRAM 21b. Instead of these two first and second VRAMs 21a and 21b, a single VRAM may be used with its two different storage areas being used as the first VRAM 21a and the second VRAM 21b. The VRAM selector 34 switches an output destination of the capture circuit 33 between the first VRAM 21a and the second VRAM 21b.

The first VRAM 21a and the second VRAM 21b are connected to a VRAM selector (SEL VRAM) 36. The VRAM selector 36 switches a source of data to the two-dimensional image processing unit 37 between the first VRAM 21a and the second VRAM 21b.

The two-dimensional image processing unit 37 is connected to a 2D line buffer 38. As with the 3D line buffer 32, the 2D line buffer 38 is a buffer memory for temporarily retaining image data for one scanning line of the second LCD 12. The image data generated by the two-dimensional image processing unit 37 is stored in this 2D line buffer 38 sequentially by one line.

The 2D line buffer 38 is connected to an LCD selector 35. The LCD selector 35 switches an output destination of the 3D line buffer 32 between the first LCD 11 and the second LCD 12, and an output destination of the 2D line buffer 38 between the first LCD 11 and the second LCD 12. In the present embodiment, the LCD selector 35 performs control such that, when the output of the 3D line buffer 32 is supplied to the first LCD 11, the output of the 2D line buffer 38 is supplied to the second LCD 12, and when the output of the 3D line buffer 32 is supplied to the second LCD 12, the output of the 2D line buffer 38 is supplied to the first LCD 11.

The portable game machine 1 has the above-described structure. Generally, the game image generated by the three-dimensional image processing unit 31 is supplied via the 3D line buffer 32 and the LCD selector 35 to the first LCD 11, while the game image generated by the two-dimensional image processing unit 37 is supplied via the 2D line buffer 38 and the LCD selector 35 to the second LCD 12. As a result, the three-dimensional game image generated by the three-dimensional image processing, unit 31 is displayed on the first display screen 11a, while the two-dimensional game image generated by the two-dimensional image processing unit 37 is displayed on the second display screen 12a. However, the present embodiment has a feature in which the above-structured portable game machine 1 is used to display different three-dimensional game images on two display screens, that is, the first display screen 11a and the second display screen 12a. Hereinafter, the operation of the portable game machine 1 according to the present embodiment is described.

The portable game machine 1 alternately performs operations with periods of one frame. Hereinafter, the operation of the portable game machine 1 is described as being divided into a process in an odd-numbered frame and a process in an even-numbered frame. Note that the "odd-numbered frame" and the "even-numbered frame" are merely so called for convenience. In other words, if one frame is assumed to be an odd-numbered frame, frames before and after that frames are even-numbered frames. Conversely, if one frame is assumed to be an even-numbered frame, frames before and after that frames are odd-numbered frames.

Figure 4:
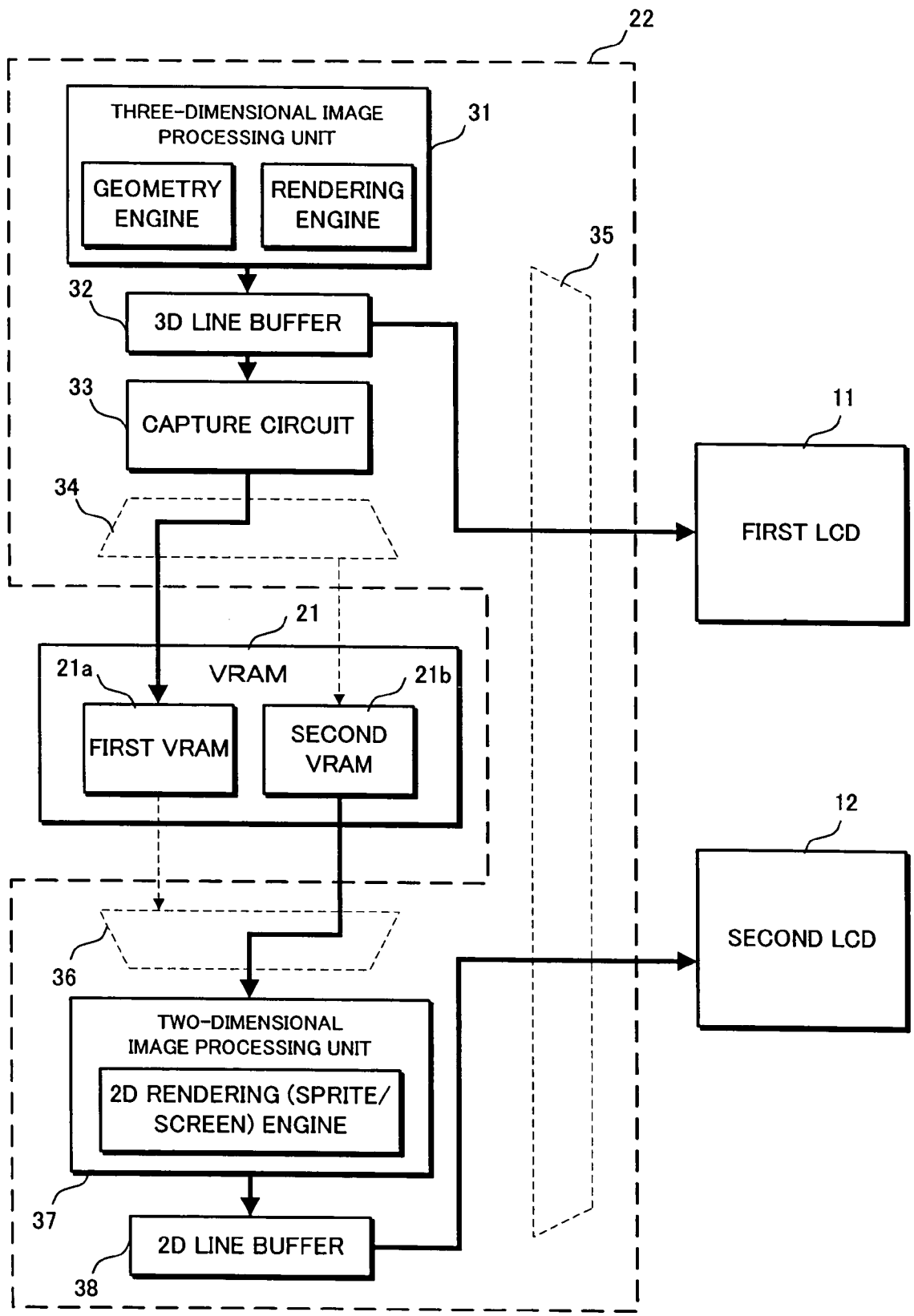
FIG. 4 is an illustration showing the operation of a portable game machine 1 in an odd-numbered frame.

FIG. 4 is an illustration showing the operation of the portable game machine 1 in an odd-numbered frame. As shown in FIG. 4, in the odd-numbered frame, the game image generated by the three-dimensional image processing unit 31 is supplied via the 3D line buffer 32 to the first LCD 11. Also, the output from the capture circuit 33 is supplied to the first VRAM 21a. That is, the game image supplied in this frame to the first LCD 11 is captured by the capture circuit 33, and is then stored in the first VRAM21a. Also, the two-dimensional image processing unit 37 reads the game image stored in the second VRAM21b (the game image captured in the immediately-preceding even-numbered frame by the capture circuit 33, as will be described further below). This game image is, as will be described further below, identical to the game image supplied in the immediately-preceding even-numbered frame to the second LCD 12. The game image read by the two-dimensional image processing unit 37 is supplied via the 2D line buffer 38 to the second LCD 12. As such, in the odd-numbered frame, the game image generated in this frame by the three-dimensional image processing unit 31 is supplied to the first LCD 11, while the game image generated in the immediately-preceding even-numbered frame by the three-dimensional image processing unit 31 is supplied to the second LCD 12.

Figure 5:
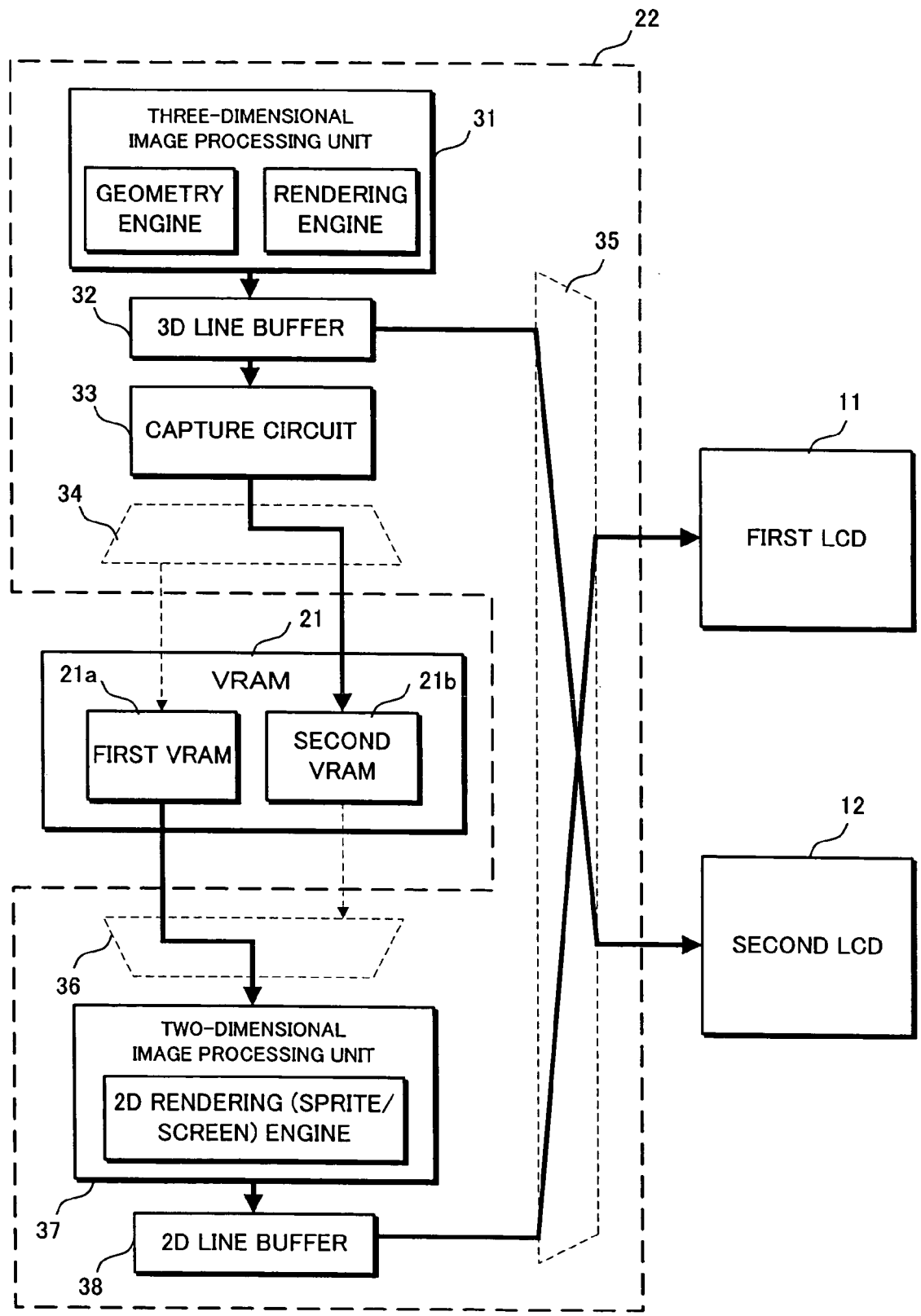
FIG. 5 is an illustration showing the operation of the portable game machine 1 in an even-numbered frame.

FIG. 5 is an illustration showing the operation of the portable game machine 1 in an even-numbered frame. As shown in FIG. 5, in the even-numbered frame, the game image generated by the three-dimensional image processing unit 31 is supplied via the 3D line buffer 32 to the second LCD 12. Also, the output from the capture circuit 33 is supplied to the second VRAM 21b. That is, the game image supplied in this frame to the second LCD 12 is captured by the capture circuit 33, and is then stored in the second VRAM 21b. Also, the two-dimensional image processing unit 37 reads the game image stored in the first VRAM 21a (the game image captured in the immediately-preceding odd-numbered frame by the capture circuit 33, as will be described further below). This game image is identical to the game image supplied in the immediately-preceding odd-numbered frame to the first LCD 11. The game image read by the two-dimensional image processing unit 37 is supplied via the 2D line buffer 38 to the first LCD 11. As such, in the even-numbered frame, the game image generated in this frame by the three-dimensional image processing unit 31 is supplied to the second LCD 12, while the game image generated in the immediately-preceding odd-numbered frame by the three-dimensional image processing unit 31 is supplied to the first LCD 11.

Figure 6:
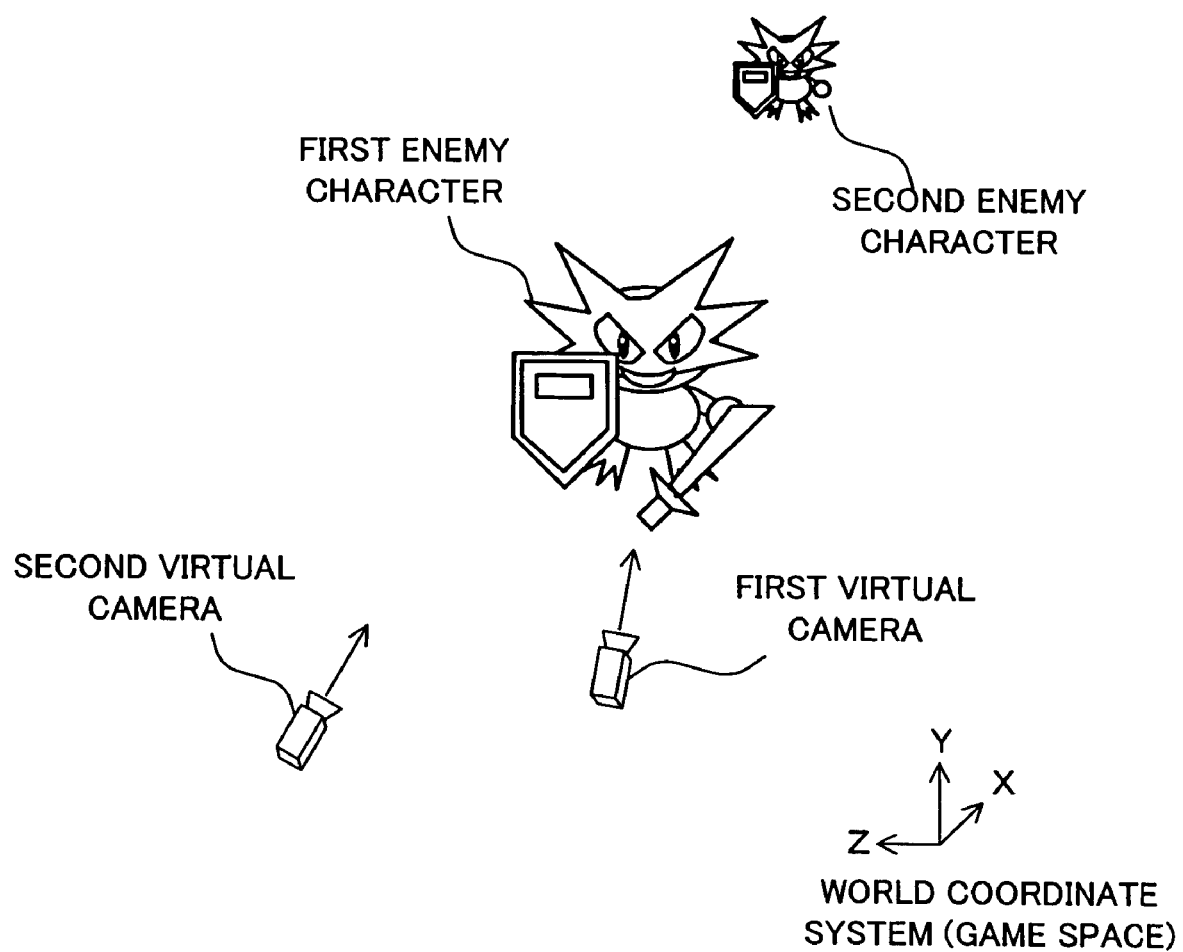
FIG. 6 is an illustration showing one example of a virtual three-dimensional game space.

In the present embodiment, the three-dimensional image processing unit 31 generates a game image representing a state in a virtual three-dimensional game space captured by virtual cameras different for odd-numbered and even-numbered frames. FIG. 6 is an illustration showing one example of the virtual three-dimensional game space. In FIG. 6, this virtual three-dimensional game space has disposed therein a first enemy character and a second enemy character as well as two virtual cameras, that is, a first virtual camera and a second virtual camera. In each odd-numbered frame, the three-dimensional image processing unit 31 generates a game image representing a state in a virtual three-dimensional game space captured by the first virtual camera. In each even-numbered frame, the three-dimensional image processing unit 31 generates a game image representing a state in a virtual three-dimensional game space captured by the second virtual camera. Alternatively, the three-dimensional image processing unit 31 may be provided with a plurality of virtual three-dimensional game spaces for generating, for odd-numbered and even-numbered frame, game images representing different states in the virtual three-dimensional game space.

Figure 7:
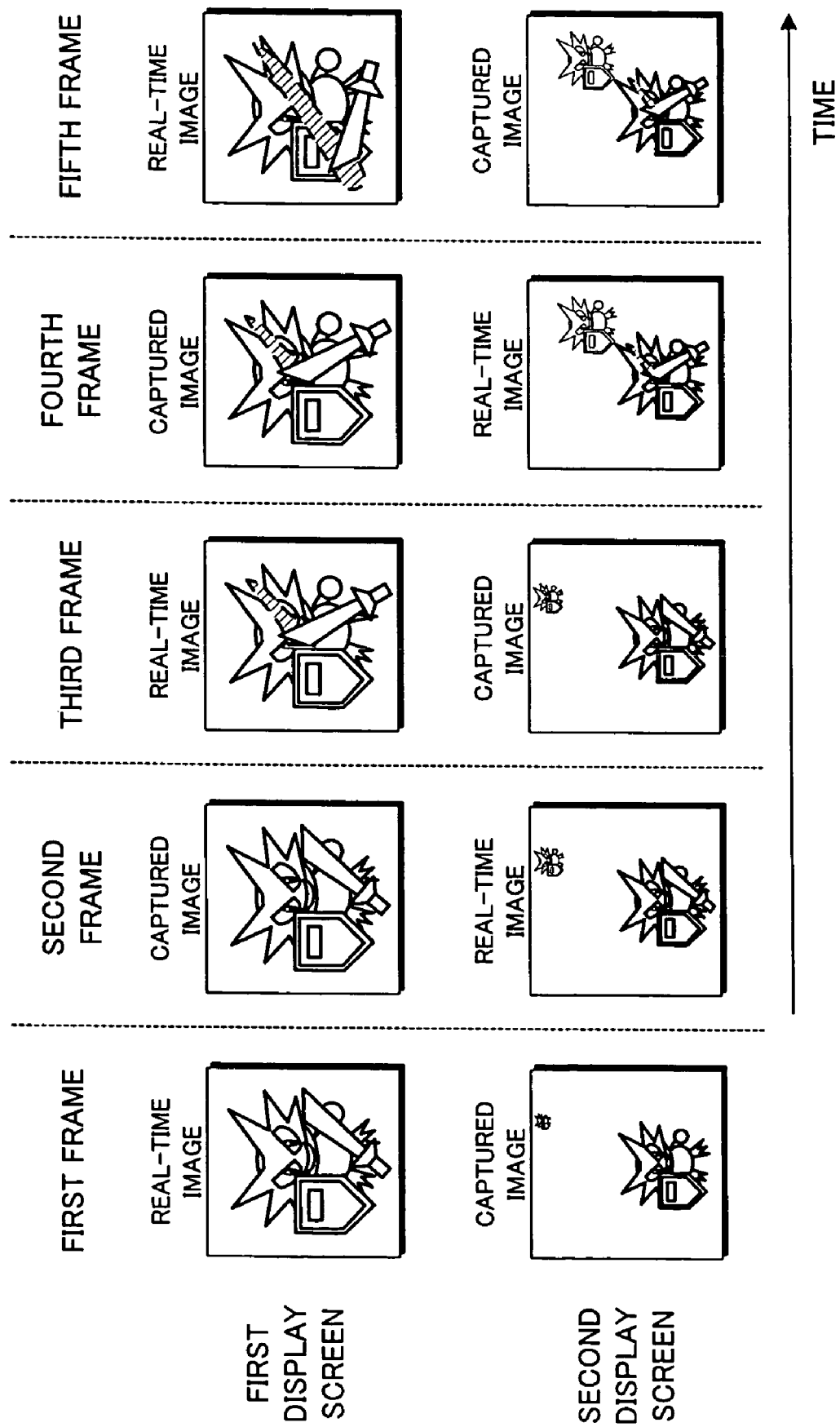

Examples of the game screen displayed on the first display screen 11a and the second display screen 12a based on the above-described operation of the portable game machine 1 are illustrated in FIG. 7. As can be seen from FIG. 7, in each odd-numbered frame, a game image generated in that frame by the three-dimensional image processing unit 31 (such an image is hereinafter referred to as a real-time image) is displayed on the first display screen 11a, while a game image generated in the immediately-preceding frame by the three-dimensional image processing unit 31 then captured by the capture circuit 33 (such an image is here in after referred to as a captured image) is displayed on the second display screen 12a. On the other hand, in each even-numbered frame, a game image (real-time image) generated in that frame by the three-dimensional image processing unit 31 is displayed on the second display screen 12a, while a game image (captured image) generated in the immediately-preceding frame by the three-dimensional image processing unit 31 and then captured by the capture circuit 33 is displayed on the first display screen 11a.

As such, in the present embodiment, a real-time image and a captured image are alternately displayed on the first display screen 11a and the second display screen 12a. Then, on the first display screen 11a, a game image representing the state of the virtual three-dimensional game space captured by the first virtual camera is displayed, while on the second display screen 12a, a game image representing the state of the virtual three-dimensional game space captured by the second virtual camera is displayed. Note that, as evident from FIG. 7, game images are displayed for each frame on the first and second display screens 11a and 12a, thereby preventing flicker on the display screens.

Figure 8:
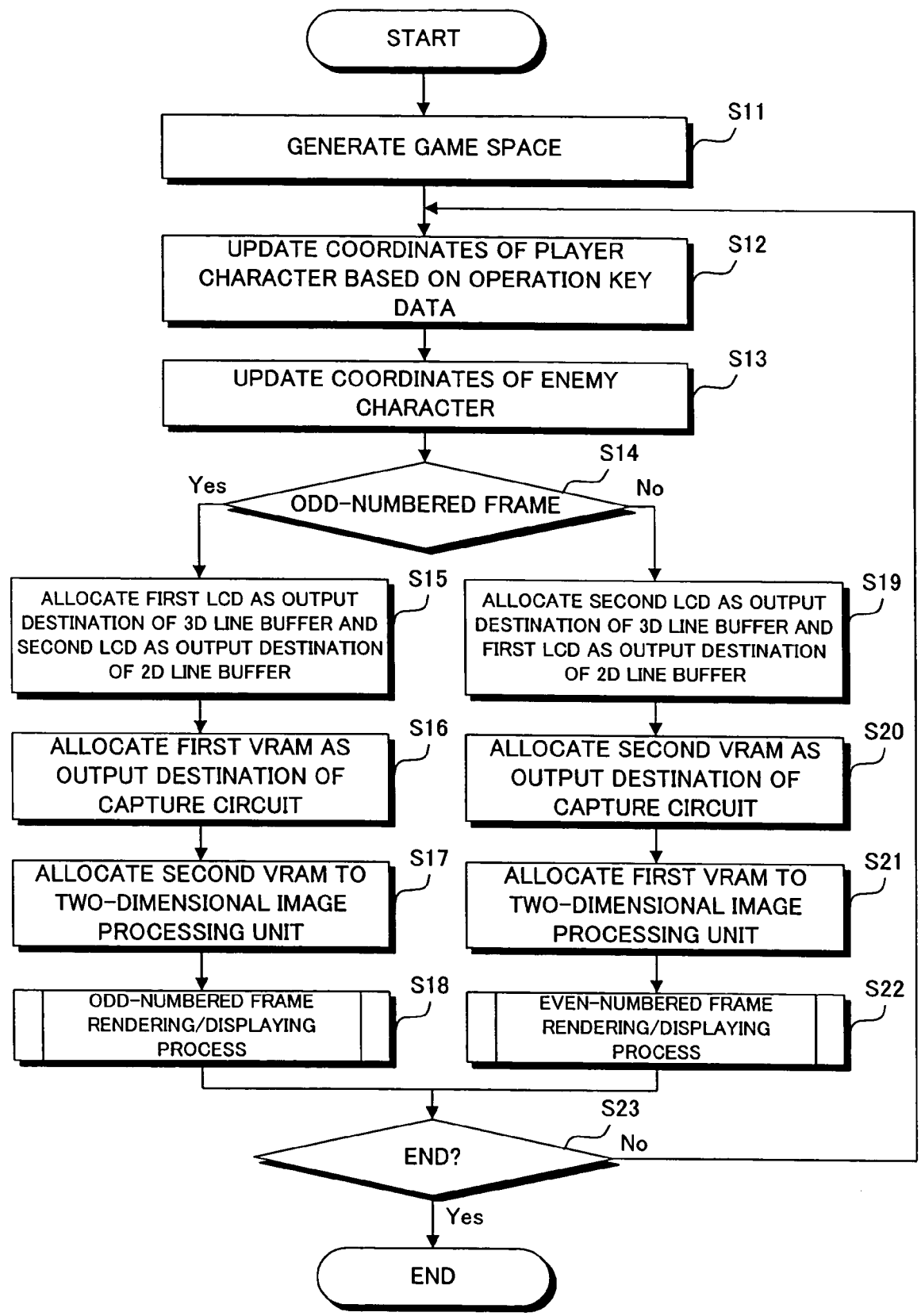
FIG. 8 is a flowchart showing the operation of the portable game machine 1.
Figure 9:
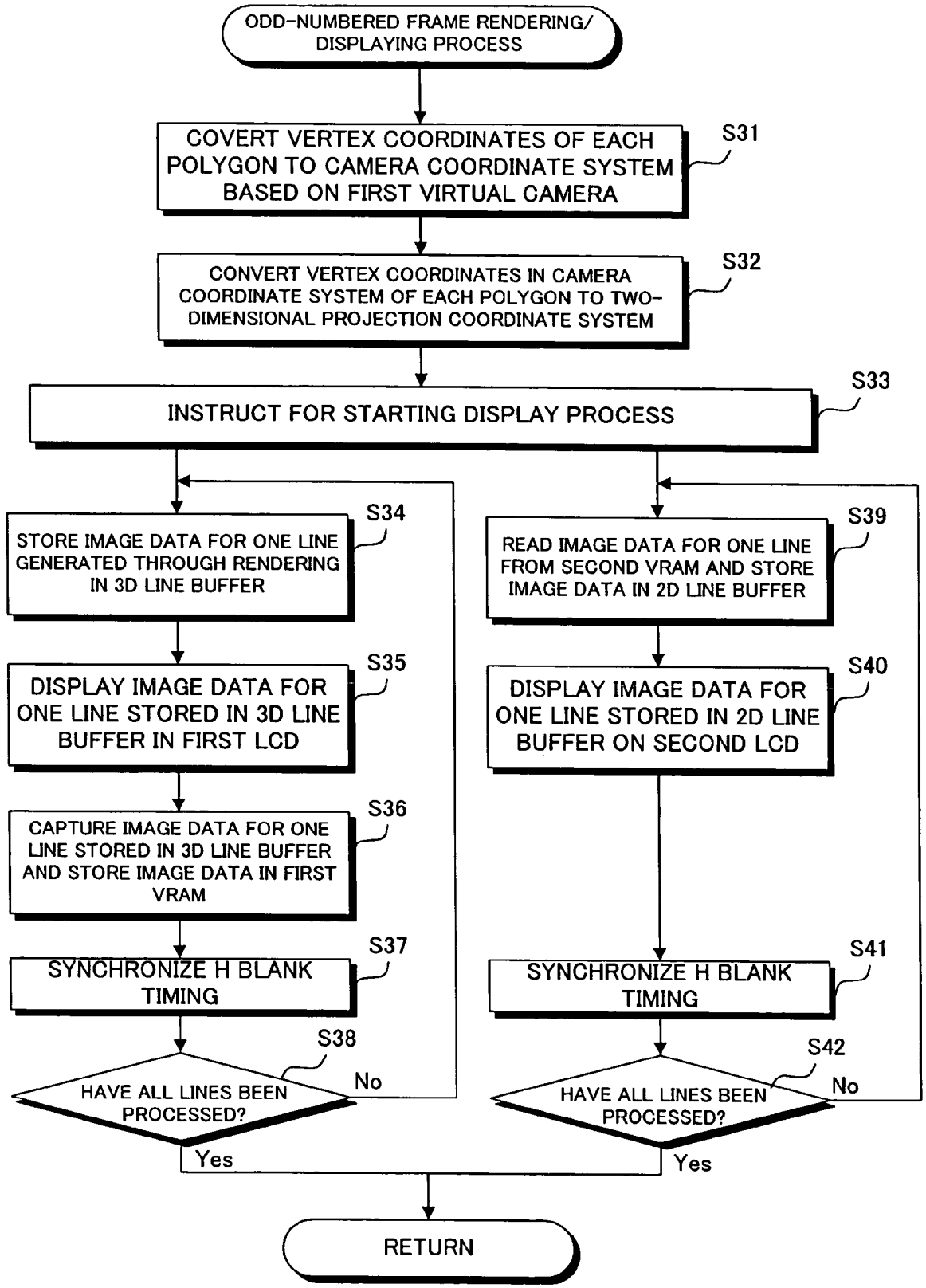
FIG. 9 is a flowchart showing a flow of an odd-numbered frame rendering/displaying process.
Figure 10:
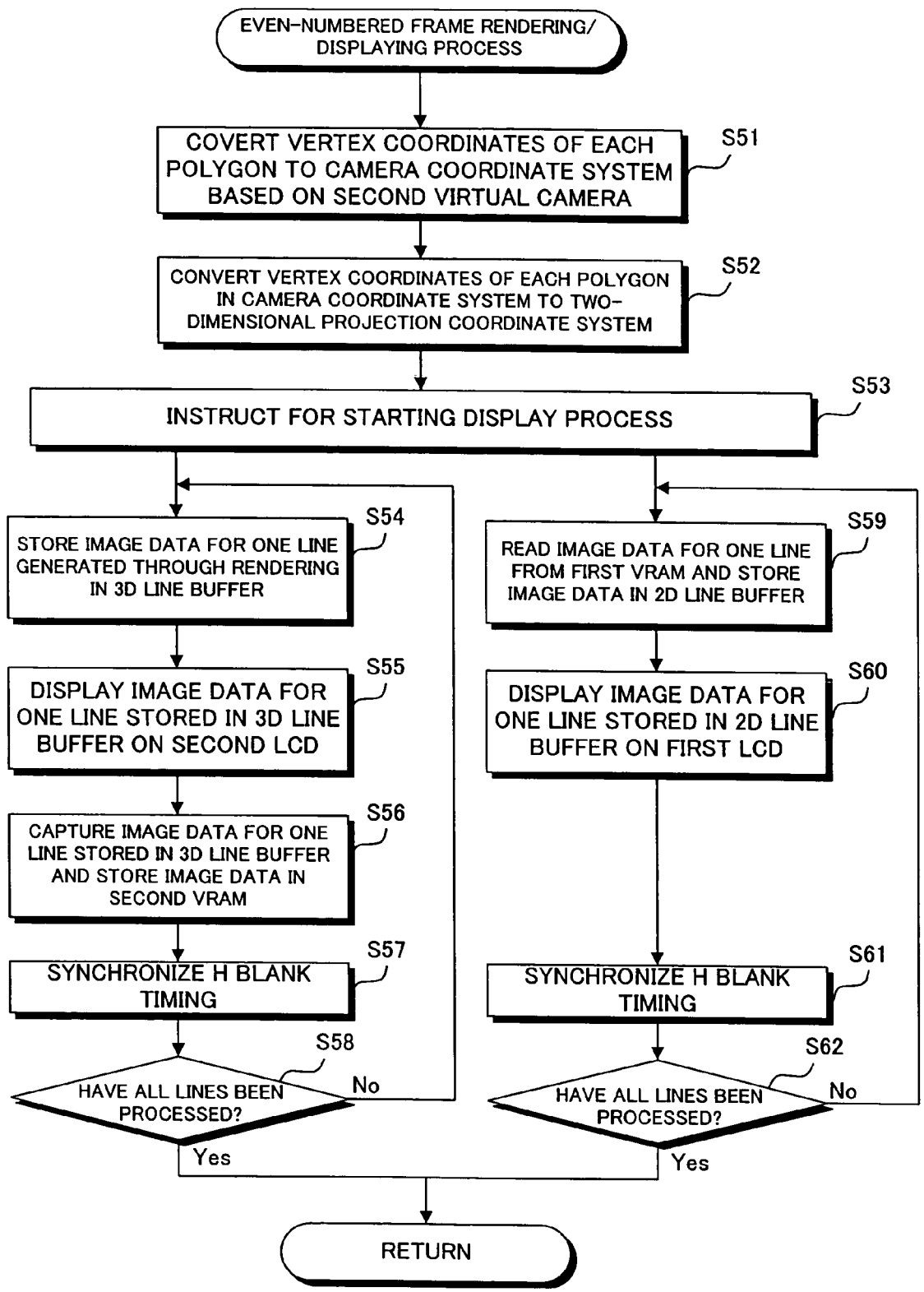
FIG. 10 is a flowchart showing a flow of an even-numbered frame rendering/displaying process.

With reference to FIGS. 8 through 10, the operation of the portable game machine 1 is described in more detail. Here, steps S11 through S17, S19 through S21, and S23 shown in FIG. 8 are described as process steps to be performed in the CPU 23 based on the game program stored in the program ROM 17a of the cartridge 17. However, any of these process steps may be achieved only by hardware.

In FIG. 8, the CPU 23 generates a virtual three-dimensional game space (S11). Specifically, in this process, world coordinates of each vertex of three-dimensional models, such as a player character and enemy characters, formed by a plurality of polygons are set at initial values. Next, based on operation key data output from the operation keys 14, the CPU 23 updates the coordinates of the player character in the virtual three-dimensional game space (S12), and then updates the coordinates of each enemy character in the virtual three-dimensional game space based on a predetermined algorithm (S13).

The CPU 23 then determines whether the current frame is an odd-numbered frame (S14).

When the current frame is an odd-numbered frame, the CPU 23 allocates the first LCD 11 as the output destination of the 3D line buffer 32 and the second LCD 12 as the output destination of the 2D line buffer 38 (S15). Furthermore, the CPU 23 allocates the first VRAM 21a as the output destination of the capture circuit 33 (S16), and the second VRAM 21b to the two-dimensional image processing unit 37 (S17). Thereafter, an odd-numbered frame rendering/displaying process (S18) is performed, and then the procedure goes to step S23. Details of the odd-numbered frame rendering/displaying process are described further below.

On the other hand, when the current frame is an even-numbered frame, the CPU 23 allocates the second LCD 12 as the output destination of the 3D line buffer 32 and the first LCD 11 as the output destination of the 2D line buffer 38 (S19). Furthermore, the CPU 23 allocates the second VRAM 21b as the output destination of the capture circuit (S20) and the first VRAM 21a to the two-dimensional image processing unit 37 (S21). Thereafter, an even-numbered frame rendering/displaying process (S22) is performed, and then the procedure goes to step S23. Details of the even-numbered frame rendering/displaying process are described further below.

In step S23, the CPU 23 determines whether the game is over. If the game continues, the procedure returns to step S12. If the game is over, the procedure ends.

Next, the details of the odd-numbered frame rendering/displaying process are described with reference to FIG. 9. The odd-numbered frame rendering/displaying process is performed by the GPU 22 based on instructions from the CPU 23.

First, the geometry engine of the three-dimensional image processing unit 31 converts vertex coordinates (in the world coordinate system) of each polygon in the virtual three-dimensional game space to the two-dimensional projection coordinate system (S32). When conversion of the vertex coordinates of each polygon is completed, an instruction for starting a display process is issued from the GPU 22 to the rendering engine of the three-dimensional image processing unit 31 and the 2D rendering engine of the two-dimensional image processing unit (S33). Upon reception of this instruction, the rendering engine of the three-dimensional image processing unit 31 and the 2D rendering engine of the two-dimensional processing unit concurrently perform their respective processes.

Upon reception of the display process starting instruction, the rendering engine of the three-dimensional image processing unit 31 generates image data for the first one line through a rendering process based on the results of conversions of the vertex coordinates of each polygon, and then stores the generated image data in the 3D line buffer 32 (S34). Then, the image data for one line stored in this 3D line buffer 32 is supplied to the first LCD 11, and is then displayed on the first display screen 11a (S35). Also, the image data for one line stored in the 3D line buffer 32 is stored in a predetermined area of the first VRAM 21a by the capture circuit 33 (S36). Then, after waiting for an H blank timing (horizontal blanking period) in order to establish horizontal synchronization (S37), the rendering engine performs a process similar to the above for the next line. That is, the rendering engine of the three-dimensional image processing unit 31 generates image data for the next one line, and then stores the generated image data in the 3D line buffer 32 (S34). Thereafter, until all lines have been completely processed (that is, until the entire screen has been completely processed), processes of steps S34 through S37 are repeated.

Upon reception of the display process starting instruction, the 2D rendering engine of the two-dimensional image processing unit 37 reads image data for the first one line of the game image stored in the second VRAM 21b, and then stores the read image data in the 2D line buffer 38 (S39). Then, the image data for one line stored in this 2D line buffer 38 is supplied to the second LCD 12, and is then displayed on the second display screen 12a (S40). Then, after waiting for an H blank timing (horizontal blanking period) in order to establish horizontal synchronization (S41), the 2D rendering engine performs a process similar to the above. That is, the 2D rendering engine of the two-dimensional image processing unit 37 reads image data for the next one line from the second VRAM 21b, and then stores the read image data in the 2D line buffer 38 (S39). Thereafter, until all lines have been completely processed (that is, until the entire screen has been completely processed), processes of steps S39 through S41 are repeated.

When all lines have been completely processed by the rendering engine of the three-dimensional image processing unit 31 and the 2D rendering engine of the two-dimensional image processing unit 37, the odd-numbered frame rendering/displaying process ends.

Next, the details of the even-numbered frame rendering/displaying process are described with reference to FIG. 10. This even-numbered rendering/displaying process is performed by the GPU 22 based on instructions from the CPU 23.

First, the geometry engine of the three-dimensional image processing unit 31 converts vertex coordinates (in the world coordinate system) of each polygon in the virtual three-dimensional game space to the camera coordinate system (S51). Furthermore, the geometry engine of the three-dimensional image processing unit 31 converts these vertex coordinates (in the camera coordinate system) to the two-dimensional projection coordinate system (S52). When conversion of the vertex coordinates of each polygon is completed, an instruction for starting a display process is issued from the GPU 22 to the rendering engine of the three-dimensional image processing unit 31 and the 2D rendering engine of the two-dimensional image processing unit (S53). Upon reception of this instruction, the rendering engine of the three-dimensional image processing unit 31 and the 2D rendering engine of the two-dimensional processing unit concurrently perform their respective processes.

Upon reception of the display process starting instruction, the rendering engine of the three-dimensional image processing unit 31 generates image data for the first one line through a rendering process based on the results of conversions of the vertex coordinates of each polygon, and then stores the generated image data in the 3D line buffer 32 (S54). Then, the image data for one line stored in this 3D line buffer 32 is supplied to the second LCD 12, and is then displayed on the second display screen 12a (S55). Also, the image data for one line stored in the 3D line buffer 32 is stored in a predetermined area of the second VRAM 21b by the capture circuit 33 (S56). Then, after waiting for an H blank timing (horizontal blanking period) in order to establish horizontal synchronization (S57), the rendering engine performs a process similar to the above for the next line. That is, the rendering engine of the three-dimensional image processing unit 31 generates image data for the next one line, and then stores the generated image data in the 3D line buffer 32 (S54). Thereafter, until all lines have been completely processed (that is, until the entire screen has been completely processed), processes of steps S54 through S7 are repeated.

Upon reception of the display process starting instruction, the 2D rendering engine of the two-dimensional image processing unit 37 reads image data for the first one line of the game image stored in the first VRAM 21a, and then stores the read image data in the 2D line buffer 38 (S59). Then, the image data for one line stored in this 2D line buffer 38 is supplied to the first LCD 11, and is then displayed on the first display screen 11a (S60). Then, after waiting for an H blank timing (horizontal blanking period) in order to establish horizontal synchronization (S61), the 2D rendering engine performs a process similar to the above. That is, the 2D rendering engine of the two-dimensional image processing unit 37 reads image data for the next one line from the first VRAM 21a, and then stores the read image data in the 2D line buffer 38 (S59). Thereafter, until all lines have been completely processed (that is, until the entire screen has been completely processed), processes of steps S59 through S61 are repeated.

When all lines have been completely processed by the rendering engine of the three-dimensional image processing unit 31 and the 2D rendering engine of the two-dimensional image processing unit 37, the even-numbered frame rendering/displaying process ends.

As described above, according to the portable game machine 1 of the present embodiment, by using the single three-dimensional image processing unit 31, different three-dimensional game images can be simultaneously displayed on the first LCD 11 and the second LCD 12 without flicker on the display screens.

Figure 11:
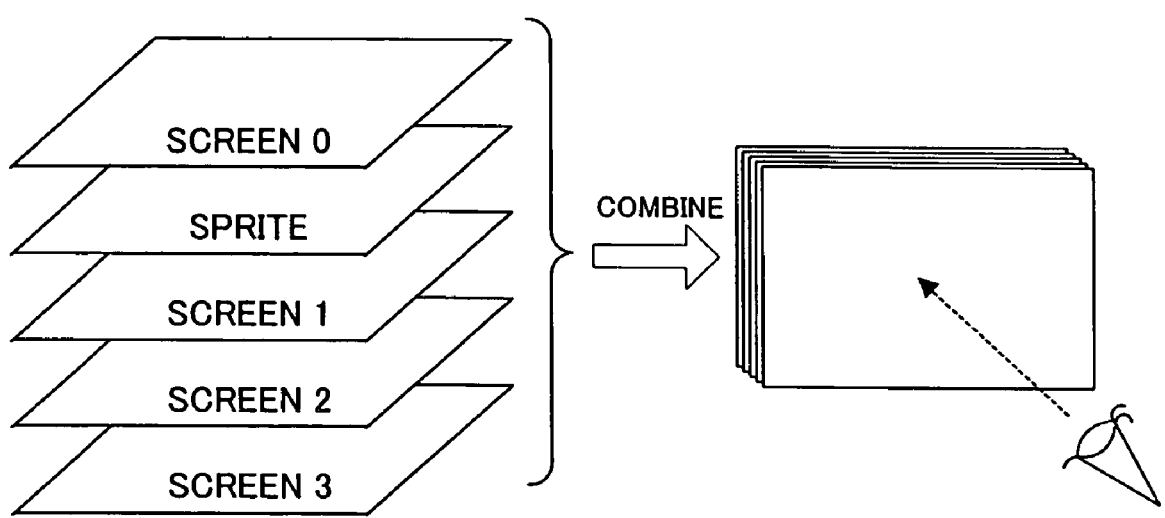
FIG. 11 is an illustration showing an original two-dimensional game image generating process to be performed by a two-dimensional image processing unit 37.
Figure 12:
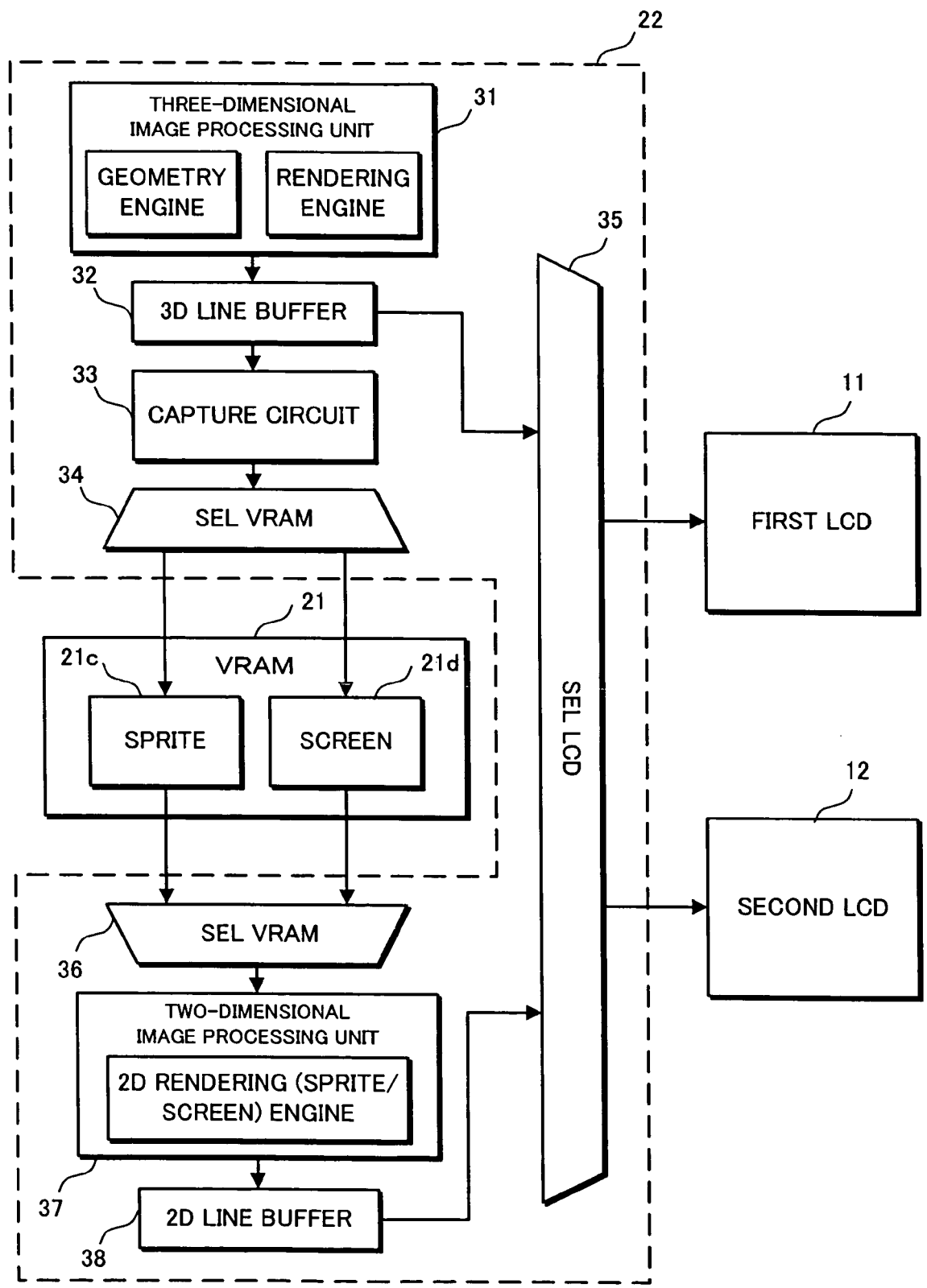
FIG. 12 is an illustration showing an internal configuration of a GPU 22 according to an exemplary modification.

As described above, when generating a normal two-dimensional game image, the two-dimensional image processing unit 37 disposes a two-dimensional image representing a character on the virtual screen called a "sprite" and a two-dimensional image representing a background on the virtual screen called a "screen", and then synthesizes these virtual screens to generate a game image to be eventually displayed. There might be the case where a plurality of "screens" are present. FIG. 11 shows an example in which five virtual screens, that is, a sprite and screens 0 through 3, are synthesized to form a two-dimensional game image. As an exemplary modification of the present embodiment, any two of these virtual screens can be used in place of the first VRAM 21a and the second VRAM 21b. The structure of the portable game machine 1 in that case is exemplarily shown in FIG. 12. In the example of FIG. 12, a sprite area 21c and a screen area 21d are used in place of the first VRAM 21a and the second VRAM 21b. Hereinafter, the operation in the exemplary modification is briefly described.

The capture circuit 33 stores the game image captured in each odd-numbered frame in the sprite area 21c of the VRAM 21 and the game image captured in each even-numbered frame in the screen area 21*d* of the VRAM 21. When generating a normal two-dimensional game image, the two-dimensional image processing unit 37 generates a two-dimensional game image formed by synthesizing the "sprite" and the "screen" and then outputs the generated image to the 2D line buffer 38. In the exemplary modification, however, in each odd-numbered frame, the two-dimensional image processing unit 37 generates a game image formed of only the "screen", and then outputs the generated game image via the 2D line buffer 38 to the second LCD 12. In each even-numbered frame, the two-dimensional image processing unit 37 generates a game image formed of only the "sprite", and then outputs the generated game image via the 2D line buffer 38 to the first LCD 11. As a result, game images similar to those shown in FIG. 7 are displayed on the first display screen 11*a* and the second display screen 12*a*.

As such, selecting a desired virtual screen from a plurality of virtual screens for display is a function originally provided to the two-dimensional image processing unit 37. Therefore, no special function has to be added to the two-dimensional image processing unit. Also, an additional storage area for temporarily storing the game image captured by the capture circuit 33 is not required, thereby suppressing cost required for the portable game machine 1.

As one embodiment, the portable game machine having a hardware structure as shown in FIGS. 2 and 3 has been described. However, the exemplary embodiment presented herein is applied not only to the portable game machine having such a hardware structure, but to the one having the above hardware structure achieved by the CPU and software. Also, the portable game machine according to the present embodiment can be emulated by a computer system, such as a personal computer or a portable information terminal. In this case, a game program that causes the computer system to achieve each hardware function of the portable game machine according to the present embodiment is supplied to the computer system. With this, the exemplary embodiment can be applied also to a general-purpose computer system.

While the exemplary embodiment presented herein has been described in detail, the foregoing description is in all aspects illustrative and not restrictive. It is understood that numerous other modifications and variations can be devised without departing from the scope.

What is claimed is:

1. A portable game machine comprising:
    a first display;
    a second display;
    three-dimensional image processing programmed logic circuitry which generates a first game image based on three-dimensional model data for each frame;
    capture programmed logic circuitry which captures the first game image generated by the three-dimensional image processing programmed logic circuitry as two-dimensional image data;
    storage locations that store the two-dimensional image data captured by the capture programmed logic circuitry;
    two-dimensional image processing programmed logic circuitry which generates a second game image based on two-dimensional image data in a previous frame already stored in the storage locations;
    output destination setting programmed logic circuitry which sets one of the first display and the second display as an output destination of the first game image and another one of the first display and the second display as an output destination of the second game image, wherein two successive frames of the same sequence of scenes are displayed on the first and second display, respectively and wherein the output destination setting program logic circuitry alternates the setting of the first display and the second display for each successive frame,
    wherein in an n-th frame of the same sequence of scenes, the first game image, generated by the three-dimensional image processing programmed logic circuitry, is output to the first display and is simultaneously captured, and the second game image, captured in an (n−1)-th frame and based on the two-dimensional image data, is output to the second display, and
    in an (n−1)-th frame of the sequence of scenes, the first game image, generated by the three-dimensional image processing programmed logic circuitry is output to the second display and is simultaneously captured, and the second game image, based on the two-dimensional image data and captured in the n-th, frame is output to the first display.

2. The portable game machine according to claim 1, further comprising:
    a first line buffer which temporarily stores data for one line of the first game image generated by the three-dimensional image processing programmed logic circuitry, wherein
    the data for one line stored in the first line buffer is sequentially output to one of the first display and the second display, thereby eventually outputting an entirety of the first game image to the one of the first display and the second display, and
    the capture programmed logic circuitry sequentially captures the data for one line stored in the first line buffer, thereby eventually storing the entirety of the first game image in the storage locations.

3. The portable game machine according to claim 2, wherein the storage locations include a first storage area and a second storage area, the portable game machine further comprises:
    a second line buffer which temporarily stores data for one line of the second game image generated by the two-dimensional image processing programmed logic circuitry;
    a first selector which switches an output destination of the capture programmed logic circuitry between the first storage area and the second storage area;
    a second selector which switches an output destination of the two-dimensional image processing programmed logic circuitry between the first storage area and the second storage area;
    a third selector which switches an output destination of the first line buffer and an output destination of the second line buffer between the first display and the second display; and
    a controller which controls a time of switching of each of the first selector, the second selector, and the third selector.

4. The portable game machine according to claim 1, wherein the storage locations are provided with storage areas that correspond to at least two virtual screens to be used when the two-dimensional image processing programmed logic circuitry generates the second game image,
    the capture programmed logic circuitry outputs the captured game image alternately to the storage areas in the storage locations that correspond to the at least two virtual screens, and
    the two-dimensional image processing programmed logic circuitry outputs one of the at least two virtual screens to the first display and another one of the at least two virtual screens to the second display.

5. The portable game machine according to claim 1, wherein the three-dimensional image processing programmed logic circuitry alternately generates and outputs, for each frame, game images representing two different states of a virtual three-dimensional game space.

6. The portable game machine according to claim 1, wherein the three-dimensional image processing programmed logic circuitry alternately generates and outputs two different game images representing a state of a single virtual three-dimensional game space captured by a virtual camera with two different settings.

7. A non-transitory storage medium having stored therein a program causing a computer connected to a display to function as:
a display unit for causing the display to display a first screen and a second screen;
a three-dimensional image processing programmed logic circuitry which generates a first game image for each frame based on three-dimensional model data;
a capture programmed logic circuitry which captures the first game image generated by the three-dimensional image processing mechanism as two-dimensional image data;
storage locations which stores the two-dimensional image data captured by the capture programmed logic circuitry;
a two-dimensional image processing programmed logic circuitry which generates a second game image based on two-dimensional image data in a previous frame already stored in the storage location; and
an output destination selector which selects one of the first display screen and the second display screen as an output destination of the first game image and another one of the first display screen and the second display screen as an output destination of the second game image wherein two successive frames of the same sequence of scenes are displayed on the first and second displays, respectively, and wherein the output destination selector alternates the selection of the first screen and the second screen as being the first display and the second display for each successive frame of the same sequence of scenes, and
wherein in an n-th frame of the same sequences of scenes,
the first game image, generated by the three-dimensional image processing programmed logic circuitry, is output to the first display and is simultaneously captured, and the second game image, captured in an (n−1)-th frame and based on the two-dimensional image data, is output to the second display, and
in an (n+1)-th frame of the same sequence of scenes,
the first game image, generated by the three-dimensional image processing programmed logic circuitry is output to the second display and is simultaneously captured, and the second game image, based on the two-dimensional image data and captured in the n-th frame, is output to the first display.

8. A non-transitory storage medium having stored therein a program to be executed in a portable game machine including:
a first display;
and a second display;
three-dimensional image processing programmed logic circuitry which generates a first game image based on three-dimensional model data for each frame;
capture programmed logic circuitry which captures the first game image generated by the three-dimensional image processing programmed logic circuitry as two-dimensional image data;
storage locations that stores the two-dimensional image data captured by the capture programmed logic circuitry;
two-dimensional image processing programmed logic circuitry which generates a second game image based on two-dimensional image data in a previous frame already stored in the storage location; and
output destination setting programmed logic circuitry which sets one of the first display and the second display as an output destination of the first game image and another one of the first display and the second display as an output destination of the second game image, wherein
in an n-th frame,
causing the three-dimensional image processing unit to generate the first display image;
causing the capture programmed logic circuitry to capture the first display image;
causing the two-dimensional image processing programmed logic circuitry to generate the second game image based on two-dimensional image data captured in the n-th frame; and
causing the output destination setting programmed logic circuitry to set the first display as the output destination of the first game image and the second display as the output destination of the second game image; and
in an (n+1)-th frame,
causing the three-dimensional image processing programmed logic circuitry to generate the first display image;
causing the capture programmed logic circuitry to capture the first display image;
causing the two-dimensional image processing programmed logic circuitry to generate the second game image based on two-dimensional image data captured in the n-th frame; and
causing the output destination setting circuit to set the second display as the output destination of the first game image and the first display as the output destination of the second game image.

9. The non-transitory storage medium according to claim 8, wherein
the three-dimensional image processing programmed logic circuitry generates game images representing a virtual three-dimensional game space viewed from a first view point and a second view point that are different from each other,
the program causes the computer to perform further:
causing the three-dimensional image processing programmed logic circuitry to generate, in the n-th frame, a first game image based on the first view point; and
causing the three-dimensional image processing programmed logic circuitry to generate, in an (n+1)-th frame, a first game image based on the second view point.

10. A portable game machine comprising:
a first display;
a second display;
three-dimensional image processing programmed logic circuitry which generates a game image based on three-dimensional model data and outputs the game image as a real-time image;

capture programmed logic circuitry which captures the real-time image generated by the three-dimensional image processing programmed logic circuitry;

storage locations which store, as a captured image, image data captured by the capture programmed logic circuitry;

two-dimensional image processing programmed logic circuitry which reads, from the storage locations, a captured image corresponding to a real-time image generated in a previous frame by the three-dimensional image processing programmed logic circuitry, and outputs the captured image; and output destination setting programmed logic circuitry which sets one of the first and second displays, which is different from an output destination of a real-time image outputted in the previous frame, as an output destination of a real-time image currently outputted from the three-dimensional image processing programmed logic circuitry, and which sets another one of the first and second displays, which is different from the output destination of the currently outputted real-time image, as an output destination of the captured image outputted from the two-dimensional image processing programmed logic circuitry, wherein in an n-th frame,
the first game image, generated by the three-dimensional image processing programmed logic circuitry, is output to the first display and is simultaneously captured, and the second game image, captured in an (n−1)-th frame and based on the two-dimensional image data, is output to the second display, and in an (n+1)-th frame,
the first game image, generated by the three-dimensional image processing programmed logic circuitry is output to the second display and is simultaneously captured, and the second game image, based on the two-dimensional image data and captured in the n-th frame, is output to the first display.

11. A portable game machine comprising:
a first display;
a second display;
three-dimensional image processing programmed logic circuitry which generates a game image based on three-dimensional model data and outputs the game image as a real-time image;
capture programmed logic circuitry which captures the real-time image generated by the three-dimensional image processing programmed logic circuitry;
storage locations which store, as a captured image, image data captured by the capture programmed logic circuitry;
two-dimensional image processing programmed logic circuitry which reads, from the storage locations, a captured image corresponding to a real-time image generated in a previous frame by the three-dimensional image processing programmed logic circuitry and outputs the captured image; and
output destination setting programmed logic circuitry which sets one of the first and second displays as an output destination of the real-time image outputted from the three-dimensional image processing programmed logic circuitry and which sets another one of the first and second displays, which is different from the output destination of the real-time image, as an output destination of the captured image outputted from the two-dimensional image processing programmed logic circuitry, wherein in an n-th frame, wherein n is an integer no less than two,
at a same time as the real-time image generated by the three-dimensional image processing programmed logic circuitry is outputted to the first display, the capture programmed logic circuitry captures the real-time image, and
the two-dimensional image processing programmed logic circuitry outputs, to the second display, a captured image corresponding to a real-time image captured in an (n−1)-th frame, and in an (n+1)-th frame,
at a same time as the real-time image generated by the three-dimensional image processing programmed logic circuitry is outputted to the second display, the capture programmed logic circuitry captures the real-time image, and
the two-dimensional image processing programmed logic circuitry outputs, to the first display, a captured image corresponding to the real-time image captured in the n-th frame.

12. A non-transitory storage medium having stored therein a program causing a computer to function as:
a display unit for causing the display to display a first screen and a second screen;
three-dimensional image processing programmed logic circuitry which generates a game image based on three-dimensional model data and outputs the game image as a real-time image;
capture programmed logic circuitry which captures the real-time image generated by the three-dimensional image processing programmed logic circuitry;
storage locations which store, as a captured image, image data captured by the capture programmed logic circuitry;
two-dimensional image processing programmed logic circuitry which reads, from the storage locations, a captured image corresponding to a real-time image generated in a previous frame by the three-dimensional image processing programmed logic circuitry, and outputs the captured image, and
output destination setting programmed logic circuitry which sets one of the first and second screens, which is different from an output destination of a real-time image outputted in the previous frame, as an output destination of a real-time image currently outputted from the three-dimensional image processing programmed logic circuitry, and which sets another one of the first and second screens, which is different from the output destination of the currently outputted real-time image, as an output destination of the captured image outputted from the two-dimensional image processing programmed logic circuitry, wherein in an n-th frame,
the first game image, generated by the three-dimensional image processing programmed logic circuitry, is output to the first display and is simultaneously captured, and the second game image, captured in an (n−1)-th frame and based on the two-dimensional image data, is output to the second display, and in an (n−1)-th frame,
the first game image, generated by the three-dimensional image processing programmed logic circuitry is output to the second display and is simultaneously captured, and the second game image, based on the two-dimensional image data and captured in the n-th frame, is output to the first display.

13. A computer-readable storage medium having stored therein a program to be executed in a portable game machine including:
a first display;
a second display;
three-dimensional image processing programmed logic circuitry which generates a game image based on three-dimensional model data and outputs the game image as a real-time image;
capture programmed logic circuitry which captures the real-time image generated by the three-dimensional image processing programmed logic circuitry;
storage locations which store, as a captured image, image data captured by the capture programmed logic circuitry;
two-dimensional image processing programmed logic circuitry which reads, from the storage locations, a captured image corresponding to a real-time image generated in a previous frame by the three-dimensional image processing programmed logic circuitry, and outputs the captured image; and
output destination setting programmed logic circuitry which sets one of the first and second displays as an output destination of the real-time image outputted from the three-dimensional image processing programmed logic circuitry, and which sets another one of the first and second displays, which is different from the output destination of the real-time image, as an output destination of the captured image outputted from the two-dimensional image processing programmed logic circuitry, the program causing a computer of the portable game machine to perform:
in an n-th frame wherein n is an integer no less than two,
causing the three-dimensional image processing programmed logic circuitry to generate a real-time image;
causing the capture programmed logic circuitry to capture the real-time image;
causing the two-dimensional image processing programmed logic circuitry to read, from the storage locations, a captured image corresponding to a real-time image captured in an (n−1)-th frame; and
causing the output destination setting programmed logic circuitry to set the first display as an output destination of the real-time image generated by the three-dimensional image processing programmed logic circuitry, and to set the second display as an output destination of the captured image read from the storage locations by the two-dimensional image processing programmed logic circuitry; and
in an (n+1)-th frame,
causing the three-dimensional image processing programmed logic circuitry to generate a real-time image;
causing the capture programmed logic circuitry to capture the real-time image;
causing the two-dimensional image processing programmed logic circuitry to read, from the storage locations, a captured image corresponding to the real-time image captured in the n-th frame; and
causing the output destination setting programmed logic circuitry to set the second display as an output destination of the real-time image generated by the three-dimensional image processing programmed logic circuitry, and to set the first display as an output destination of the captured image read from the storage locations by the two-dimensional image processing programmed logic circuitry.

* * * * *